(12) United States Patent
Smithwick et al.

(10) Patent No.: US 8,823,702 B2
(45) Date of Patent: Sep. 2, 2014

(54) VOLUMETRIC DISPLAY WITH RIM-DRIVEN, VARIFOCAL BEAMSPLITTER AND HIGH-SPEED, ADDRESSABLE BACKLIGHT

(75) Inventors: Quinn Smithwick, Pasadena, CA (US); Lanny Smoot, Thousand Oaks, CA (US); Daniel Reetz, North Hollywood, CA (US)

(73) Assignee: Disney Enterprises, Inc., Burbank, CA (US)

( * ) Notice: Subject to any disclaimer, the term of this patent is extended or adjusted under 35 U.S.C. 154(b) by 208 days.

(21) Appl. No.: 13/558,083

(22) Filed: Jul. 25, 2012

(65) Prior Publication Data
US 2014/0028663 A1  Jan. 30, 2014

(51) Int. Cl.
*G06T 15/00* (2011.01)
*G09G 5/02* (2006.01)

(52) U.S. Cl.
USPC ........... 345/419; 345/589; 359/847; 359/858; 348/E13.056; 348/E13.057

(58) Field of Classification Search
CPC .......... H04N 13/0495; H04N 13/0493; H04N 13/0402; G02B 26/0825; G02B 27/2278
See application file for complete search history.

(56) References Cited

U.S. PATENT DOCUMENTS

| | | | | |
|---|---|---|---|---|
| 4,638,800 | A * | 1/1987 | Michel | 606/14 |
| 6,302,542 | B1 * | 10/2001 | Tsao | 353/7 |
| 7,428,001 | B2 * | 9/2008 | Schowengerdt et al. | 348/51 |
| 2006/0158614 | A1 * | 7/2006 | Eichenlaub | 353/7 |

OTHER PUBLICATIONS

Eric G. Rawson, "Vibrating varifocal mirrors for 3-D imaging" IEEE spectrum, Sep. 1969.*
Smoot et al, "A Volumetric Display Based on a Rim-Driven Varifocal Beamsplitter and LED Backlit LCD", SIGGRAPH 2011, Vancouver, British Columbia, Canada, Aug. 7-11, 2011.*

* cited by examiner

*Primary Examiner* — Tize Ma
(74) *Attorney, Agent, or Firm* — Marsh Fischmann & Breyfogle LLP; Kent A. Lembke

(57) ABSTRACT

An apparatus for generating volumetric images viewable without 3D eyewear. The apparatus includes an image display assembly displaying a first image at a first display time and a second image at a second display time (e.g., a number of planar or 2D images on a display screen/surface). The apparatus includes a flexible two-way mirror element (a varifocal beamsplitter). During operations, the first and second images from the display assembly are directed toward and then reflected from the back side of the mirror element. The apparatus also includes a hoop-shaped frame supporting a peripheral edge of the mirror element. A driver shakes the frame to resonate the mirror element between convex and concave shapes while it is used for reflecting the first and second images. The apparatus also includes a concave mirror positioned relative to the mirror element to receive the reflected first and second images.

26 Claims, 7 Drawing Sheets

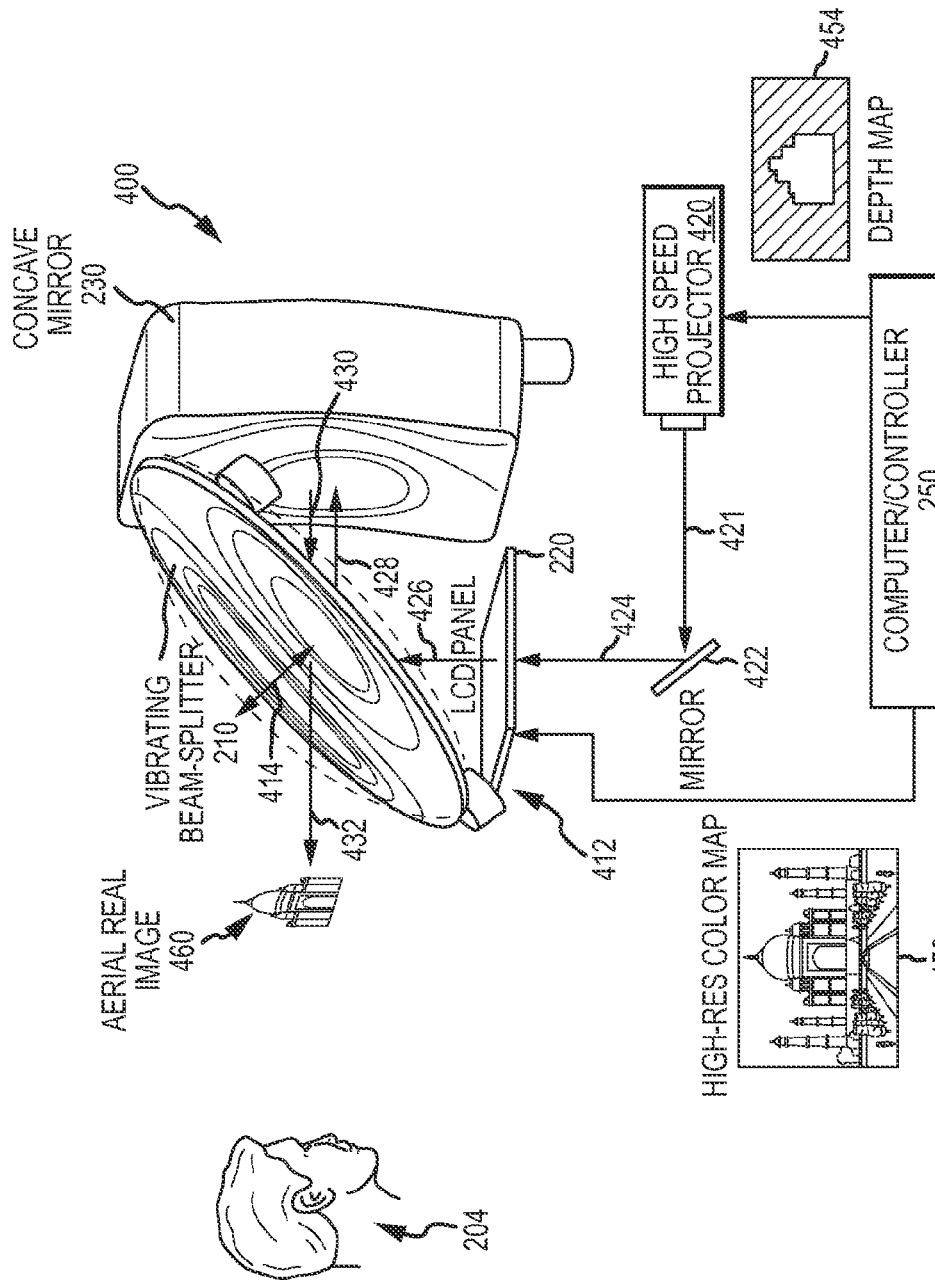

VOLUMETRIC DISPLAY WITH RIM-DRIVEN, VARIFOCAL BEAMSPLITTER AND HIGH-SPEED, ADDRESSABLE BACKLIGHT

BACKGROUND

1. Field of the Description

The present description relates, in general, to the illusion of three dimensional (3D) image generation and projection, and, more particularly, to systems and methods using a varifocal beamsplitter to produce 3D images or depth and space illusions (e.g., real volumetric images that protrude into the viewer space or side of mirror/glass) without requiring viewers to wear 3D glasses or the like.

2. Relevant Background

There is a growing trend toward using 3D projection techniques in theatres and in home entertainment systems including video games and computer-based displays. In many conventional 3D projection techniques, the right eye and the left eye images are delivered separately to display the same scene or images from separate perspectives so that a viewer sees a three dimensional composite, e.g., certain characters or objects appear nearer than the screen and other appear farther away than the screen. However, stereoscopy, stereoscopic imaging, 3D imaging, and volumetric display are labels for any technique capable of creating the illusion of depth in an image.

Often, the illusion of depth in a photograph, movie, or other two-dimensional image is created by presenting a slightly different image to each eye or the creation of parallax. In most animated 3D projection systems, depth perception in the brain is achieved by providing two different images to the viewer's eyes representing two perspectives of the same object with a minor deviation similar to the perspectives that both eyes naturally receive in binocular vision.

There is a continuous desire and need to provide new techniques that provide cost effective but eye-catching content with depth and dimension. For example, it is desirable to grab the attention of crowds in shopping malls, on busy streets, in amusement parks, and other crowded facilities such as airports and entertainment arenas. As discussed above, 3D imagery and volumetric displays are exciting ways to appeal to viewers and hold their attention. However, the use of 3D imagery has, in the past, been limited by a number of issues. Typically, 3D projection technologies require the viewer to wear special viewing glasses. This is often inconvenient for many applications and can significantly add to costs to provide the 3D media for projection and also for the special eyewear that has to be provided to the viewer.

Some attempts have been made in providing volumetric displays without the need for eyewear, but these have not been widely adopted as each has its own limitations. For example, FIG. 1 illustrates a volumetric display 100 that makes use of a vibrating reflective mirror (comprised of an aluminized Mylar® sheet or the like). As shown, the display 100 includes a membrane mirror 110 that is attached to an acoustical driver 120 in the form of a subwoofer of a loudspeaker, and the membrane mirror 110 vibrates 115 as shown to provide a varifocal mirror.

An image 130 is displayed in multiple planes to a viewer 160 as the vibrating membrane mirror 110 reflects a 2D image projected or provided by an oscilloscope or cathode ray display 170. As shown, the sequence of planar objects of the displayed image 130 has volume and appears to be in a position behind the mirror 110 (i.e., is a virtual image 135). The varifocal mirror 110 affects optical translation of the 2D image from display 170 to form a volume.

Systems similar to display 100 suffer from a number of shortcomings. The use of an acoustic driver or speaker 120 results in the acoustic power or sound to be radiated out into the viewing area or to the viewer 160, which creates a large amount of unwanted noise and requires significant driving power. The solid driver 120 (e.g., a subwoofer) does not allow beamsplitting such that the mirror 110 has to be fully reflective. Therefore, the viewer 160 must look at the mirror 110 off axis to see the monitor 170. Even when the monitor 170 is off axis, at some point when the viewer 160 moves the monitor 170 will obstruct their view. Further, the system 100 can only provide a virtual image as shown at 135 to be recessed into the display apparatus 100 (e.g., the image 130 viewed by the viewer 160 appears to be a distance behind the vibrating mirror 110 as is typical for conventional mirrors). The primary image generator was a single display 170, which inextricably and undesirably linked image resolution and display rendering (e.g., speed).

Due to the shortcomings of such volumetric displays, there remains a need for systems and methods for providing 3D or volumetric displays in a cost effective manner and without the need for special eye or head wear.

SUMMARY

To address the above and other problems, an apparatus is provided for generating volumetric images. The apparatus includes an image display assembly that may be operated for displaying a first image at a first display time and a second image at a second display time (e.g., a number of planar images or 2D images on a display screen/surface). The apparatus also includes a flexible two-way mirror element (a varifocal beamsplitter element) with a back side and a front side. During operations, the first and second images from the display assembly are directed toward and then reflected from the back side of the mirror element. The apparatus also includes a rim support (e.g., a hoop-shaped frame) attached to a peripheral edge of the mirror element.

The apparatus further includes a driver operable to drive or shake the rim support to resonate the mirror element between a convex configuration and a concave configuration while it is used for reflecting the first and second images. The apparatus also includes a concave mirror (e.g., a rigid or static concave mirror surface) positioned relative to the mirror element to receive the reflected first and second images. Significantly, the concave mirror reflects and transmits the first and second images through the mirror element (e.g., transmitted through the material of the mirror element) to generate a real volumetric image with a volume defined by display locations of the first and second images. During operations, the display volume is in front of the front side of the mirror element and is made up of the spaced apart first and second images (which are 2D or planar real images).

In some embodiments, the driver includes at least two acoustic drivers (e.g., three bass shakers or the like) attached at spaced apart locations to the rim support. The mirror element may be driven by the acoustic drivers at a frequency of at least about 30 Hertz so as to limit flicker in the volumetric image, and the first and second images may be displayed on any stroke of the mirror element by synchronizing the first and second display times with the movement of the mirror element by the drivers (e.g., on the forward stroke, on the backward stroke, or on all or portions of both strokes).

In many cases, the mirror element includes a sheet of aluminized polyester (such as Mylar® or the like). In such cases, the apparatus further may include two or more tensioning elements attaching the peripheral edge of the mirror element to the rim support and selectively applying tensile forces to the sheet to define a surface tension for the mirror element (e.g., greater tension may be useful to provide higher resonant frequencies for the mirror element).

The image display assembly may include a transmissive display panel and a backlight selectively operating to sequentially light first and second portions of the display panel to display the first and second images. During operation, the sequential lighting may be repeated during the displaying of the first and second images to provide the real volumetric image on an ongoing manner. The transmissive display panel, for example, may be a liquid crystal display panel (without a backlight).

The backlight may be an LED array that is addressable while it may also be a high-speed projector (e.g., a 5000-fps DLP projector or the like) switching between the first and second portions. In this way, the first and second portions may be defined by depth maps controlling projection of light onto the liquid crystal display panel. In the case of a high-speed projector, the depth maps provide a mapping of pixels in the first and second images on the liquid crystal display panel to the projected light from the projector (e.g., pixel-by-pixel depth selection for a color map or image provided to the display panel).

BRIEF DESCRIPTION OF THE DRAWINGS

FIGS. 4A-4C illustrate a volumetric display system during operation to display a volumetric image made up of three planar images and using a high-speed projector (but an LED array or other light source may be utilized in other display systems)

DETAILED DESCRIPTION OF THE PREFERRED EMBODIMENTS

Briefly, the following description presents a high resolution, full color, volumetric display. The volumetric display utilizes a unique optical element in the form of a large-aperture, rim or frame-driven, adjustable-resonance, varifocal beamsplitter. The volumetric display is operable to generate real images (i.e., images appearing on the observer's or viewer's side of the beamsplitter or mirror element) that have volume provided by a sequential display of a number of display planes, which are provided by varying the focus of the beamsplitter used to reflect images from an image generator onto a concave mirror for direction through the beamsplitter to a viewer.

The "varifocal" effect is achieved with one or more inertial drivers that shake or vibrate the rim or frame supporting the beamsplitter, which is formed of a flexible sheet of reflective and transmissive material such as circular sheet of flexible aluminized polyester or Mylar® (such an arrangement is also called a scrim mirror). The image generator, which provides images to the backside of the beamspltter, may be a transmissive display, such as an RGB liquid crystal (LC) panel, which is backlit by an addressable light source, such as an LED array, a high-speed video projector, or the like. In this manner, the volumetric display generates volumetric real images with addressable depth planes, such as at a block level with use of an LED array light source or at the pixel level with use of a high-speed video projector as the backlight for the transmissive display.

Figure 1:
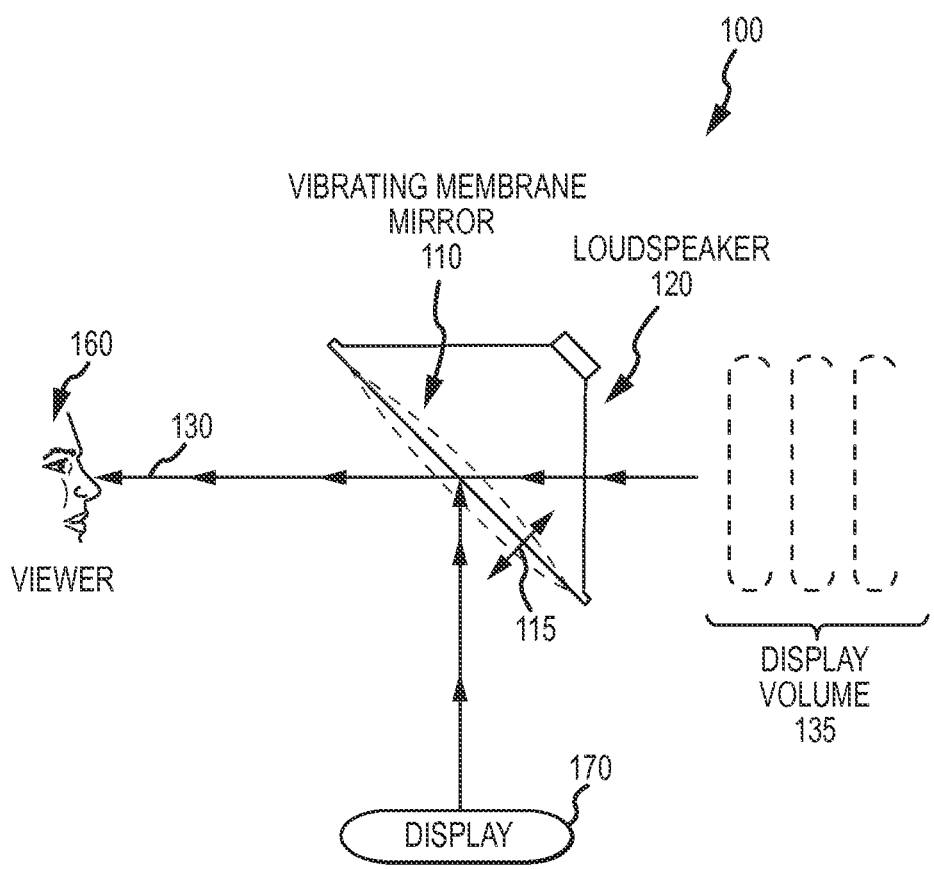
FIG. 1 is a prior art volumetric display using a loudspeaker to provide acoustic driving of a membrane mirror.
Figure 2:
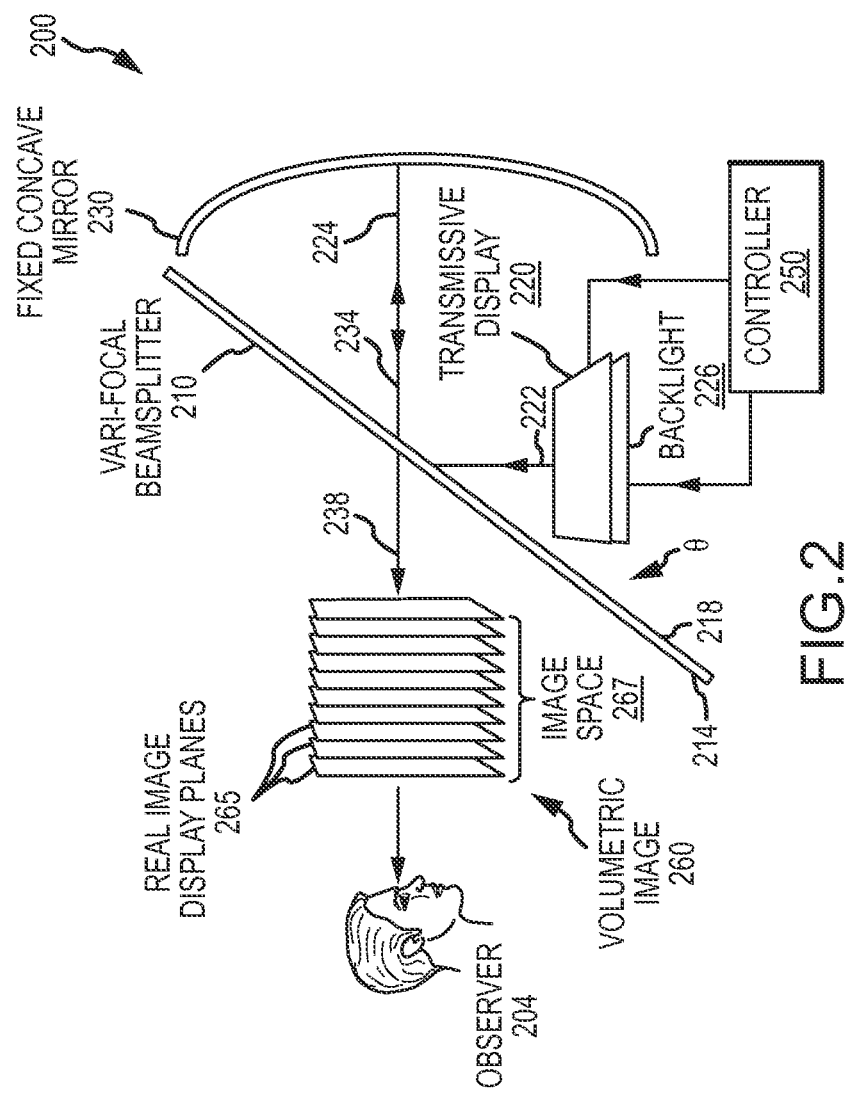
FIG. 2 is a side schematic of a volumetric display of the present invention showing use of a varifocal beamsplitter (vibrating transmissive mirror element) along with a fixed concave mirror to provide a real volumetric image.

FIG. 2 illustrates with a schematic or functional block representation a volumetric display system 200 of one embodiment of the invention. As shown, the system 200 includes a varifocal beamsplitter 210 arranged at an angle, θ, relative to horizontal such as an angle of 30 to 60 degrees (e.g., 45 degrees or the like), with such an angle being useful to present a volumetric image 260 along a conventional sight line of an observer (but other beamsplitter angles, θ, may be used for differing display axes to suit different applications).

As explained below, the beamsplitter 210 is "varifocal" due to being shaken or vibrated such that it is planar (due to tensioning) when at rest or the system 200 not operating and then is cycled between a convex shape (outer or front side 214 curved outward a distance toward the observer 204) and a concave shape (front side 214 curved inward a distance (e.g., the same distance) away from the observer 204). These movements may be considered "strokes" of the beamsplitter 210 and differing planes 265 of the volumetric image 260 are shown in the image space 267 during such strokes (e.g., all on the forward stroke, all on the back stroke, or a combination thereof) to provide the depth of the image space 267. The volumetric image is "real" because the space 267 is on the observer 204 side or out from the front side 214 of the beamsplitter 210 (rather than being a virtual image a distance behind the back side 218 of the beamsplitter 210).

As shown, a set of source or input images 222 are provided by a screen of a transmissive display 220. The transmissive display 220 may take the form of an LC panel, and a controller 250 may provide black and white or full color images to the display 220 for use in generating image stream 222. All or portions of the transmissive display 220 are backlit by a backlight or light source 226. The backlight 226 is typically addressable such that portions or even pixels may be selectively backlit on the display 220, e.g., background objects can be illuminated independently (at a different time) than midground objects in the source/input images, which, in turn are illuminated independently (at another different time) than background objects to provide three or more planes to create a volumetric image 260 with planar displays 265.

As explained below, the controller 250 may use a depth map to control operation of the backlight 226 while using a high-resolution color map to control the transmissive display 220. These two maps may be synchronized, with each other and with vibration of the beamsplitter 210, to control content of the input or source images 222 and, consequently, the content of each real image display plane 265 in the volumetric image 260, e.g., what image is visible in each spaced apart real image plane 265. The spacing between planes 265 and the overall depth of the image space 267 controlled by the deflection of the beamsplitter 210 and the timing of the backlight 226 in illuminating the transmissive display.

The source image 222 from the screen/surface of display 220 is directed to the back side 218 of the varifocal beamsplitter 210. A portion of this light (such as about 50 percent) is reflected as shown at 224 onto a reflective surface of a concave mirror 230 (which is fixed/rigid, unlike the beamsplitter/mirror element 210), and the concave mirror 230 is chosen to have a focal point for the received light 224 between the observer 204 and the front surface 214 so as to provide a real image rather than a virtual image (e.g., a focal point defining the image space 267 in combination with movement or the stroke of the beamsplitter 210). The light 234 is reflected from the concave mirror 230 back toward the beamsplitter 210, which allows a portion 238 (such as 50 percent) to pass through to the observer 204. This enables the observer 204 to view the volumetric image 260 in the image space 267. Since only about 25 percent of the light from source 226 reaches the observer 204, it is typically preferable to use a high illumination source such as 300 to 2000 lumens (with 1500 or more typically being preferred).

The image 260 is provided as a sequential number of real image display planes 265, which the observer 204 perceives as an object with true volume. The greater the number of planes 265, the more "solid" the image 260 will appear, but the system 200 can be practiced with as few as 2 to 3 planes up to 10 or more planes depending on factors such as the speed with which the backlight can vary which portions of the display screen 220 are illuminated (address sets of pixels or the like to define the differing content provided in each plane 265).

In one embodiment, the backlight 226 is an LED array configured such that each LED may be addressed and separately strobed such that one or more LEDs may be used by the controller 250 to backlight the transmissive display (e.g., an LC panel). The size of the LED array may vary to suit the size of the LC panel 220 such as a 16 by 16 array of LEDs arranged in an addressable matrix. Light 222 from this LC/LED combination (220/226) is reflected by the beamsplitter 210, e.g., a half-silvered varifocal beamsplitter. A portion of the reflected light 224 is directed toward the fixed concave mirror 230.

The concave mirror 230 focuses light 234 back onto and through 238 the beamsplitter 210, where it forms stacked real images 265 of the surface of the LC or transmissive display 220 in a space or location 267 in front of the varifocal beamsplitter 210 or its front side/surface 214. In one implementation, the mirror 230 was a fixed concave, f/2, 0.75 meter, diagonal mirror. This concave mirror 230 was used to reflect the light 224 back through it as shown with arrows 234 and 238. The prototype concave mirror 230 provided an approximately 0.3 meter diagonal real image 260 extending out into the viewer space (shown with image space 267 that is located past the front surface/side 214 of the beamsplitter 210). It should also be understood that the use of the concave mirror 230 also corrects a depth inversion issue inherent in some volumetric display systems.

In the prototype of volumetric display 200, the primary image source or transmissive display 220 was an off-the-shelf 15-inch diagonal LC panel with its backlight removed. The backlight 226 was a custom-built 16 by 16 array of high brightness, white-light, diffused LEDs. This array 226 illuminated the LC panel 220 at up to 320 depth planes per second. During each depth frame, selected LEDs were strobed for approximately 2 milliseconds to set depth plane positions (e.g., planes 265) in a volume (e.g., image space 267 of volumetric image 260). In one implementation, 8 depths (e.g., planes 265) could be independently selected in 256 separate areas (16 times 16), which may lead to an egg crate-type artifact that can be eliminated, if desired, through the use of a backlight 226 in the form of a high-speed projector (e.g., to allow pixel-by-pixel mapping of light to display 220).

Figure 3:
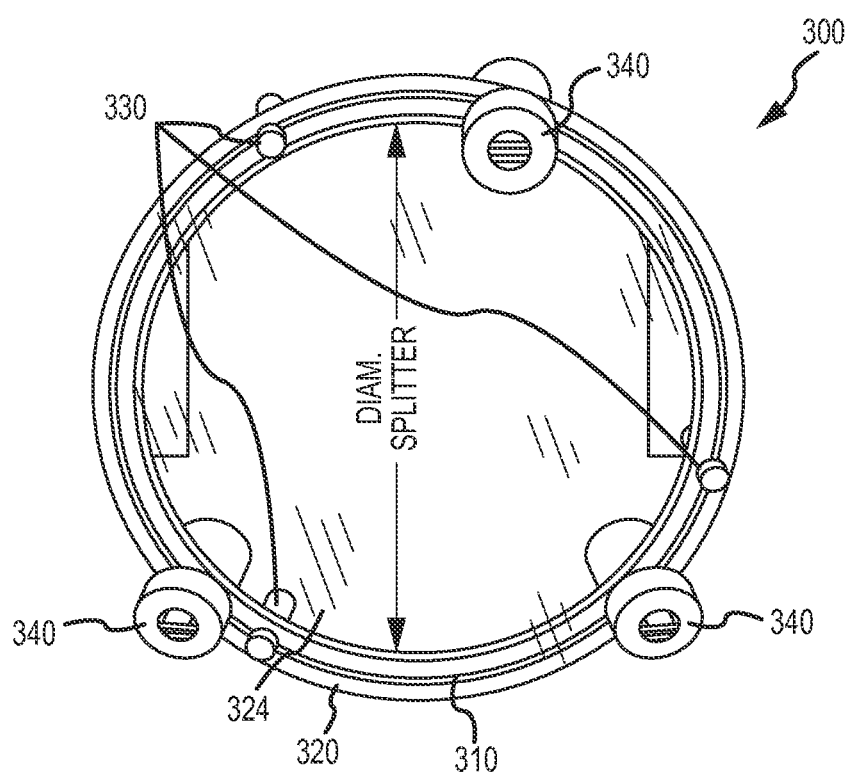
FIG. 3 is a rear or back view of a varifocal beamsplitter (or beamsplitter assembly) that may be used in the volumetric displays described herein such as the display of FIG. 2.

To create the volumetric images 260, the controller 250 is adapted to provide synchronization of the image on the LC display 220, the LED or other backlight 226 and the beamsplitter drive (see drivers 340 in FIG. 3, for example, used to resonate the flexible mirror element or varifocal beamsplitter 210. In one prototype, such synchronization was achieved with a frame sync signal from which all other timing signals were derived. Particularly, a sine wave version of the frame sync was power amplified and used to drive the beamsplitter transducers/drives (which were connected in series). An adjustable delay line was used to adjust for a fixed phase delay due to the mirror/beamsplitter 210 dynamics. Backlight patterns for backlight 226 were stored by the controller 250 and downloaded by a serial link to a microprocessor, and a pulse version of the frame sync was used to load the backlight frame data (e.g., used to control an LED array) from the microprocessor to the backlight (e.g., LED array) via a dedicated parallel data path.

FIG. 3 illustrates one embodiment of a varifocal beamsplitter 300 that may be used in display systems such as for beamsplitter 210 in volumetric display 200 of FIG. 2. The beamsplitter 300 includes a support frame 310, which in the case of a circular beamsplitter 300 is a hoop (e.g., a metal or plastic ring) with an opening or hole defining an inner diameter, $Diam_{Splitter}$, of the beamsplitter 300. This opening defines an aperture through which light reflected from a concave mirror may be transmitted to generate a volumetric display. The diameter, $Diam_{Splitter}$, may vary to practice the invention from several inches to much larger sized volumetric displays such as 1 to 5 feet for more (with an aperture of 30 to 40 inches being useful in some display devices).

The hoop 310 may be considered a tensioning hoop as the beamsplitter 300 includes a sheet 320 of aluminized polyester (or Mylar® from DuPont or the like) that is stretched over the hoop 312 and attached to its periphery. The backside 324 of the sheet 320 (and beamsplitter 300) are shown in FIG. 3, and two or more tensioning adjustment elements 330 (e.g., three or more typically are used to distribute loads) are used to adjust the amount of tension applied to the surface 324 of the sheet 320. In some embodiments, the sheet 320 is attached to a frame member extending about the hoop 310, and tension adjustment by elements 330 involves movement of the hoop 310 relative to this frame member relative to the hoop 310 which abuts the back side or surface 324 of the sheet 320 (e.g., to press or push on the back surface 324 with the hoop 310). The amount of tension may also vary to practice the invention with it typically being desirable that the tension is high enough that the surface 324 is taut (e.g., at least planar) when at rest, and the greater the tension applied the higher the resonant frequency of the beamsplitter 300, which may be desirable in some applications.

The beamsplitter 300 further includes a number of inertial drivers (or transducers) 340 mounted to or in contact with the support frame or hoop 310. For example, three drivers 340 may be used, as shown, to vibrate the hoop 310, which causes the surface 324 to also vibrate or move so as to deform or cycle between a concave and a convex configuration relative to the planar at-rest configuration. The drivers 340 are mounted on the frame 310 so not in contact with the surface 324, and such edge mounting is desirable as the full aperture provided by surface 324 is transmissive and not opaque (and allows for light from a display screen to be directed onto back surface 324 rather than onto the front surface only as in prior devices). This also provides a much less noisy varifocal beamsplitter 320 than use of acoustic drivers. The wide open aperture provided by the beamsplitter 300 via sheet or flexible mirror element 320 allows a whole image to be viewed or displayed in a volumetric image provided by a volumetric display (e.g., display 200 of FIG. 2 using beamsplitter 300).

In one prototype, inertial drivers 340 were provided as Aura Sound AST-2B-4 "Bass Shakers" to provide vibration, and three of these drivers 340 were mounted with equidistal spacing around the periphery of the hoop/frame 310. When powered/operated by a controller, the voice coils of these drivers 340 shift an internal weight over a short distance, which supplies a small sinusoidal impetus to the outer frame (e.g., the frame member adjacent to and mechanically linked via the tensioning elements to the tensioning hoop 310 or to the support frame/hoop 310) of the beamsplitter 300. It may be desirable to control flicker in the generated volumetric display such that the drivers 340 may be operated to resonate the surface 324 via hoop 310 at 30 Hertz if project only on front cycle (making back surface concave) or at 60 Hertz if project on both front and back cycle (making back surface convex).

In the prototype, the hoop 310 (a customized metal hoop) was used to push evenly against the back surface 324 of the beamsplitter sheet 320 along its outer edge (with respect to a frame to which the sheet 320 was affixed) by operation of the tensioning elements 330. This acted to adjust the surface tension of the beamsplitter sheet 320 (e.g., the Mylar® sheet). The surface tension of the surface 324, thus, can be tuned in a drum-like manner to achieve a specific resonant frequency. The taut surface 324 in one prototype of beamsplitter 300 provided a high Q-factor resonance and also large excursions (e.g., movement of the center point of the sheet 320 during operation of the drivers 340) with relatively small applied forces (by drivers 340).

As shown in FIG. 3, the mirror or beamsplitter 300 is open (back and front), which minimizes emitted noise by allowing front and back sound waves to partially cancel. Spring mounts may be used to isolate vibration of the beamsplitter 300 from the rest of a volumetric display (such as the transmissive display (e.g., LC panel), the backlight (e.g., high-speed, high-brightness projector), and concave mirror). As discussed above, the mirror or beamsplitter diameter, $Diam_{Splitter}$, may vary to implement the beamsplitter 300, but, in one prototype, the aperture provided by surface sheet 320 was about 1 meter.

With the use of an LED array as the backlight or light source, a volumetric display system may typically be operated at an overall volume refresh rate of about 20 Hz. This is less than the flicker fusion frequency of 30 Hz, and it may only be acceptable when visible or observer-perceived flicker in the generated volumetric image is acceptable or desired. Surprisingly, one major limitation in achieving a higher refresh rate was the maximum achievable cycle rate of the beamsplitter. Hence, it was determined through research that the varifocal beamsplitter diameter, $Diam_{Splitter}$, should be less than 1 meter and more preferable less than about 0.7 meters (with 0.67 meters used in one implementation) as this allowed the volume refresh rate to about 30 Hz, which eliminated flicker in the volumetric image. The decrease in the varifocal beamsplitter diameter, $Diam_{Splitter}$, did not affect the usable image field of view because the fixed concave mirror was the primary constraint in this regard.

Figure 4B:
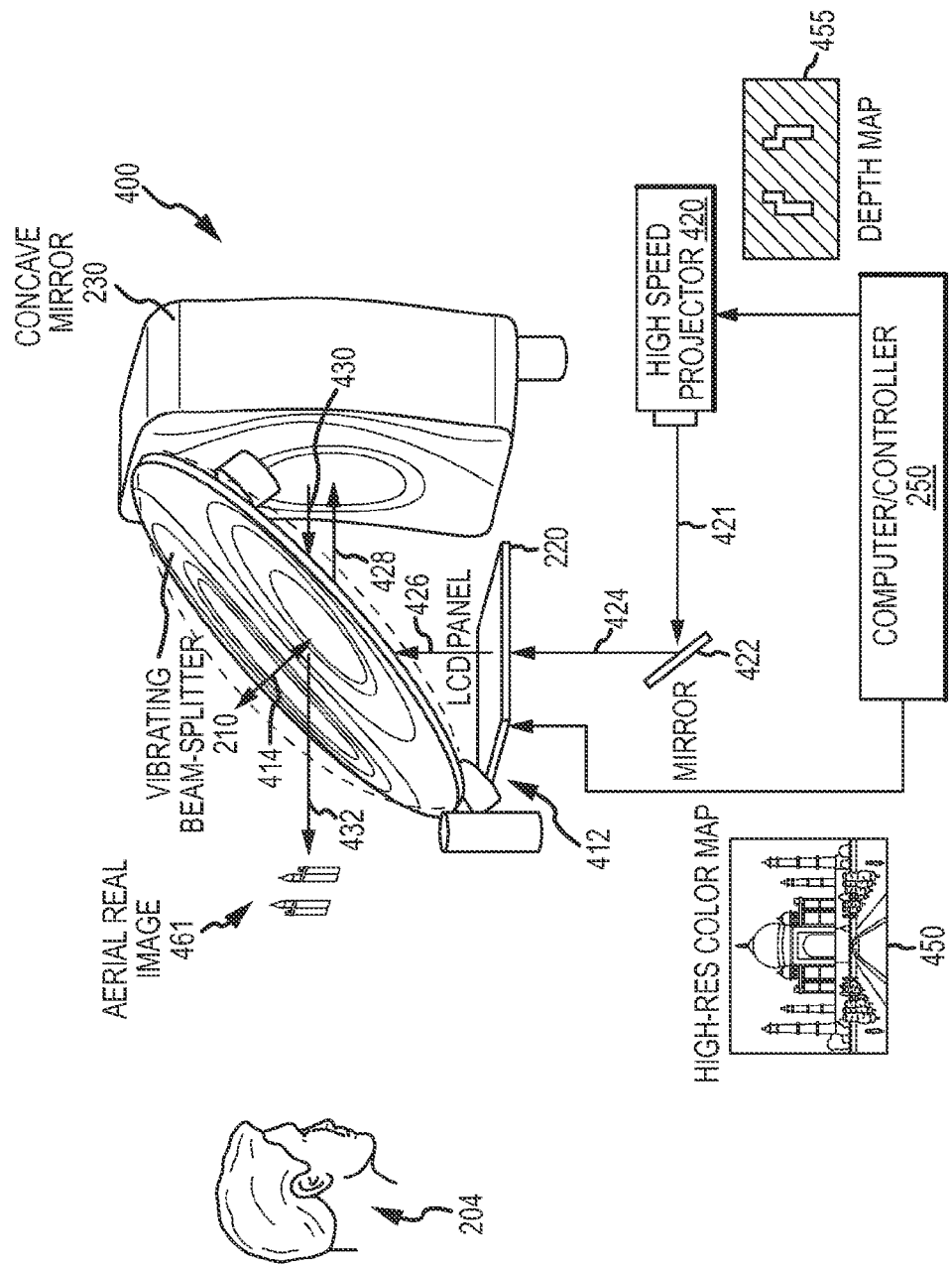
Figure 4C:
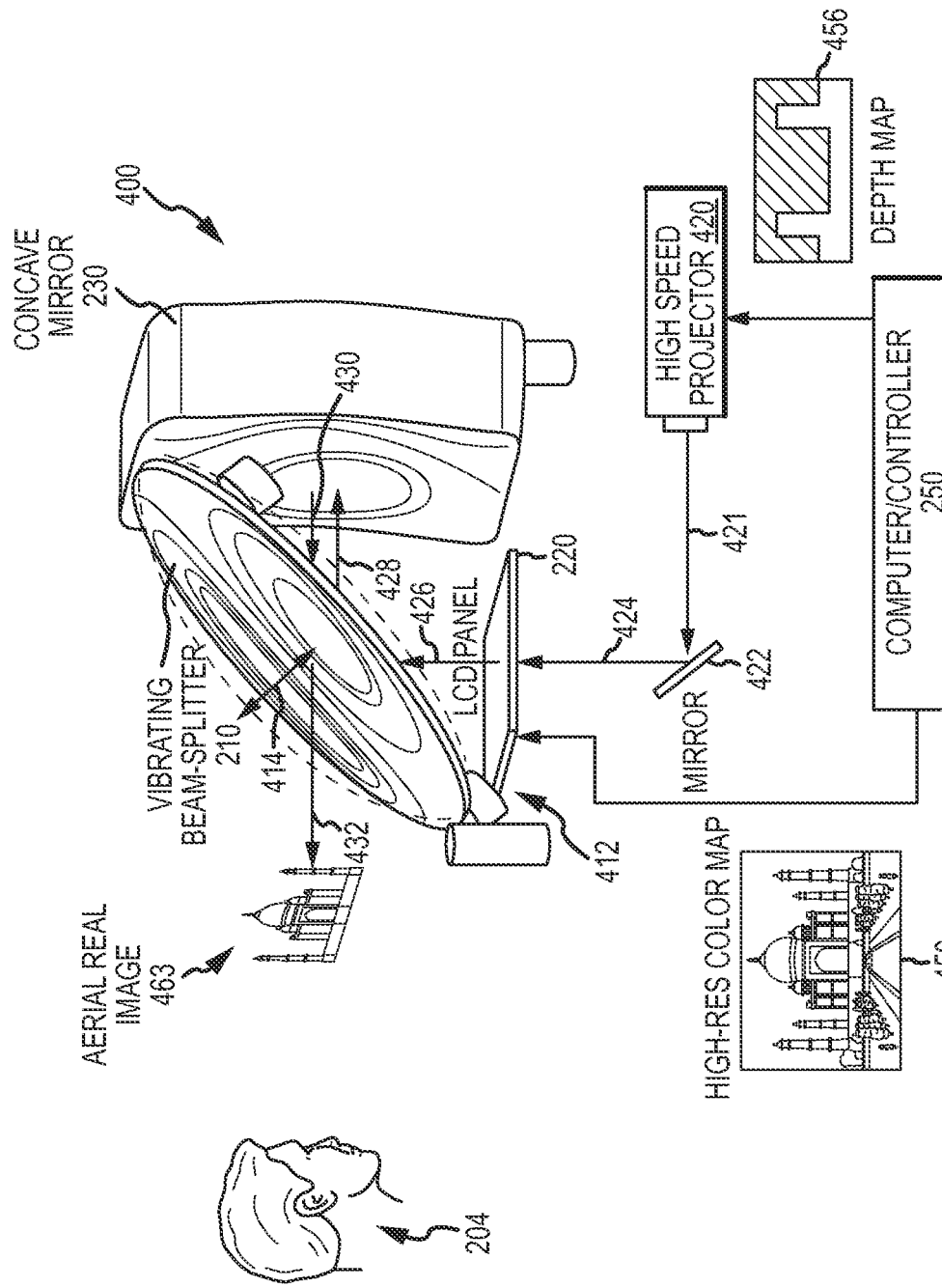

FIGS. 4A-4C illustrate a volumetric display system 400 during its operation to display a volumetric image made up of three planar images and using a high-speed projector 420 as the backlight (but an LED array or other light source may be utilized in other display systems). Components that were shown and described in system 200 of FIG. 2 are shown with like numbers and the description provided with regard to FIG. 2 is applicable to system 400.

Particularly, as shown, the display system 400 includes a beamsplitter 210 that is vibrated with drivers or transducers 412 (e.g., the beamsplitter 210 is rim or edge driven). The shaking of the support hoop or frame by drivers 412 causes the beamsplitter 210 to have its mirror element (e.g., a sheet of flexible aluminized plastic such as Mylar® or the like) have its central portion move away from and toward the concave mirror 230 (e.g., to become concave and convex rather than remaining in tensioned planar state (or "at-rest" state)) as is shown with arrow 414. In the operation shown in FIGS. 4A to 4C, the display or projection occurs on the forward portion of the stroke where the mirror moves 414 away from the concave mirror 230 toward the observer 204 (or out into or toward observer space). However, the amount of excursion (distance center of tensioned sheet moves 414) is relatively small as the beamsplitter resonates or vibrates due to rim shaking by drivers 412 and is not shown in the figures but will be readily understood by those skilled in the art.

The system 400 includes a computer or controller 250 that functions to retrieve a high-resolution color map (image source/input) 450, which it passes to the LCD panel 220. Then or concurrently, the computer 250 retrieves and passed sequential data to the high-speed projector 420 to illuminate sets or portions of the image 450 displayed on LCD panel 220. With the use of a high-speed projector 420, individual or, more typically, sets of pixels of the panel 220 may be illuminated or strobed to display a planar image, as shown at 460, in the observer space. To this end, an encoded depth map 454 is transmitted to the projector 420 (or a number of these may be stored or buffered in the projector 420).

In response, the projector 420 operates to project light 421 that is directed by mirror 422 onto the back of the display panel 220 as shown at 424. The light 424 does not illuminate all of the pixels of the panel 220 but instead lights the mapped or defined set of pixels/portions as shown in depth map 454. The panel 220 displays a portion of the image produced by color map 450 as shown at 426, and a portion 428 is reflected by vibrating beamsplitter 210 onto the concave mirror 230. The concave mirror 230 reflects the light 430 back to the beamsplitter 210 through which a portion 432 passes into the observer space where it is perceived by the viewer as an aerial real image 460 (e.g., a plane of light at a particular location relative to the beamsplitter 210 based on the movement 414 of the beamsplitter 210).

FIGS. 4B and 4C show differing points in time of the operation of the display system 400. In FIG. 4B, the same color map 450 is provided to the display panel 220. However, a differing depth map 455 is provided to the projector/backlight 420 and the movement 414 causes the beamsplitter 210 to be at a different position or shape in its stroke or cyclic movement caused by rim-mounted drivers 412. Hence, a differing aerial real image 461 is displayed to the observer 204, e.g., a background plane/portion 461 whereas the image 460 was a midground or central portion of the volumetric image generated by display system 400.

In FIG. 4C, the same color map 450 is again provided to the display panel 220. A different or third depth map 456 is provided to the projector 420 such that the light 424 delivered to backlight the panel 222 causes a differing image or real image plane to be displayed via the beamsplitter 210. The beamsplitter 210 is at a third position due to movement 414 such that the third image plane is presented at a differing or third position in the image space in front of the beamsplitter 210. For example, this third image may be a foreground portion (or foreground set of pixels of the color map 450) and be located closer to the observer 204 or further in front of the beamsplitter 210. As shown in FIG. 4C, the real image 463 is perceived as a set of all the displayed planes due to the volume refresh rate such that all the planar images 461, 462, 463 are viewed substantially concurrently (without flicker if a refresh rate of 30 Hz or more is provided) and appear to provide a volumetric real image (rather than a set of flashing/flicker planar images).

As shown in the system 400, a projector such as a high-speed digital light processing (DLP) projector (e.g., a "DLP LightCommander" distributed by Logic PD, Inc. or the like) may be used as the backlight source (e.g., backlights 226, 420). The projector's light 421 may be directed by the mirror 422 (but this is an optional component of system 400) onto a thin sheet diffuser (not shown) at the back surface of the LC panel 220. The projector's output 421 is matched line for line with the LC panel's pixels, in some embodiments, using Moiré test patterns or the like.

The display 400 may use a color image 450 and its corresponding depth map 454-456. The color image 450 is displayed on the LC panel 220 while the depth map 454-456 is encoded by the controller 250 and sent to the projector 420 (or other backlight) The encoding depends upon whether static images are stored in an internal sequence buffer (e.g., a DLP projector, such as a DLP LightCommander that may provide 5000 frames per second and up to 2000 or more lumens output, may be operated in a static buffer structured light mode or image buffering mode) or whether real time images are sent to the projector 420 via the controller 250 (e.g., projectors such as a DLP LightCommander may receive real-time images via DVI/HDMI when operating in a DVI Real-Time Structured Light mode or similar mode for other projector designs).

With the use of an LED or similar backlight, a high-resolution color map can be sent to the LCD panel, but the depth map is limited to the resolution of the array such as to a 16 by 16 depth map that can be provided via a microcontroller (e.g., an 8-bit microcontroller or the like) to the LED array to backlight portions of the LCD panel (and the displayed input/source color image). With an LED array and concave mirror, the volumetric display can create real images of the LCD panel (what is displayed on the screen) in space. The varifocal mirror/beamsplitter displaces the real image to form multiple layers (e.g., 2 to 8 or more layers). The slow LCD panel provides color while the relatively fast LED array illuminated differing portions at sequential, distinct display times to produce each displayed real image layer to provide high resolution color texturing in a volumetric (e.g., 2.5D) display with full parallax (e.g., 20° fov). A computer, in a prototype, was used to send images to the LCD panel while concurrently streaming backlight patterns to a microcontroller used to control the LED array by loading and latching the LEDs based on the received backlight patterns.

In some cases, the backlight (or projector) may have an internal buffer, and, in some embodiments, this buffer can be used to hold up to 96 one bit-per-pixel (binary) images/patterns at 1024 by 768 pixel resolution. Such a buffering mode may, therefore, be used to display static imagery. In other words, these static images/patterns can be used as the depth maps defining which pixels or portions of the LC display and its displayed color map are illuminated at each sequential display time. These patterns or depth maps associated with each real image plane are loaded into the buffer such as through the projector's GUI or using its SDK or the like. In any case, the patterns are automatically translated into a .dbi format (described later herein) and stored in the buffer. In the buffer mode (e.g., a LightCommander's Static Buffer Structured Light Mode), the stored patterns are repeatedly cycled through at a frame rate (such as 6 to 5000 Hz or the like) that may be user defined/selected such as via a projector GUI. A synchronization signal output by the projector every frame may also be enabled and used as a frame sync signal in a volumetric display.

Each of the stored patterns represents one depth plane. In other words, the overall depth map is segmented and separated into one image or pattern per depth plane (e.g., the depth maps 454-456 in FIGS. 4A-4C may be thought of as these depth plane patterns that when combined provide an overall depth map for a volumetric image). Patterns are provided for both the forward and the backward stroke of the mirror (or stretched sheet of the beamsplitter). However, in some embodiments, the display system may be controlled to only "draw" or display on the forward mirror stroke so as to avoid the complication of depth plane interleaving. To this end, half the patterns are left blank, thereby providing 0 to about 48 depth planes while drawing/displaying on both strokes would provide 0 to about 96 planes (with the number of depth planes varying with the operating frequency of the projector as well as the length of each strobe or projection duration per plane).

Figure 5:
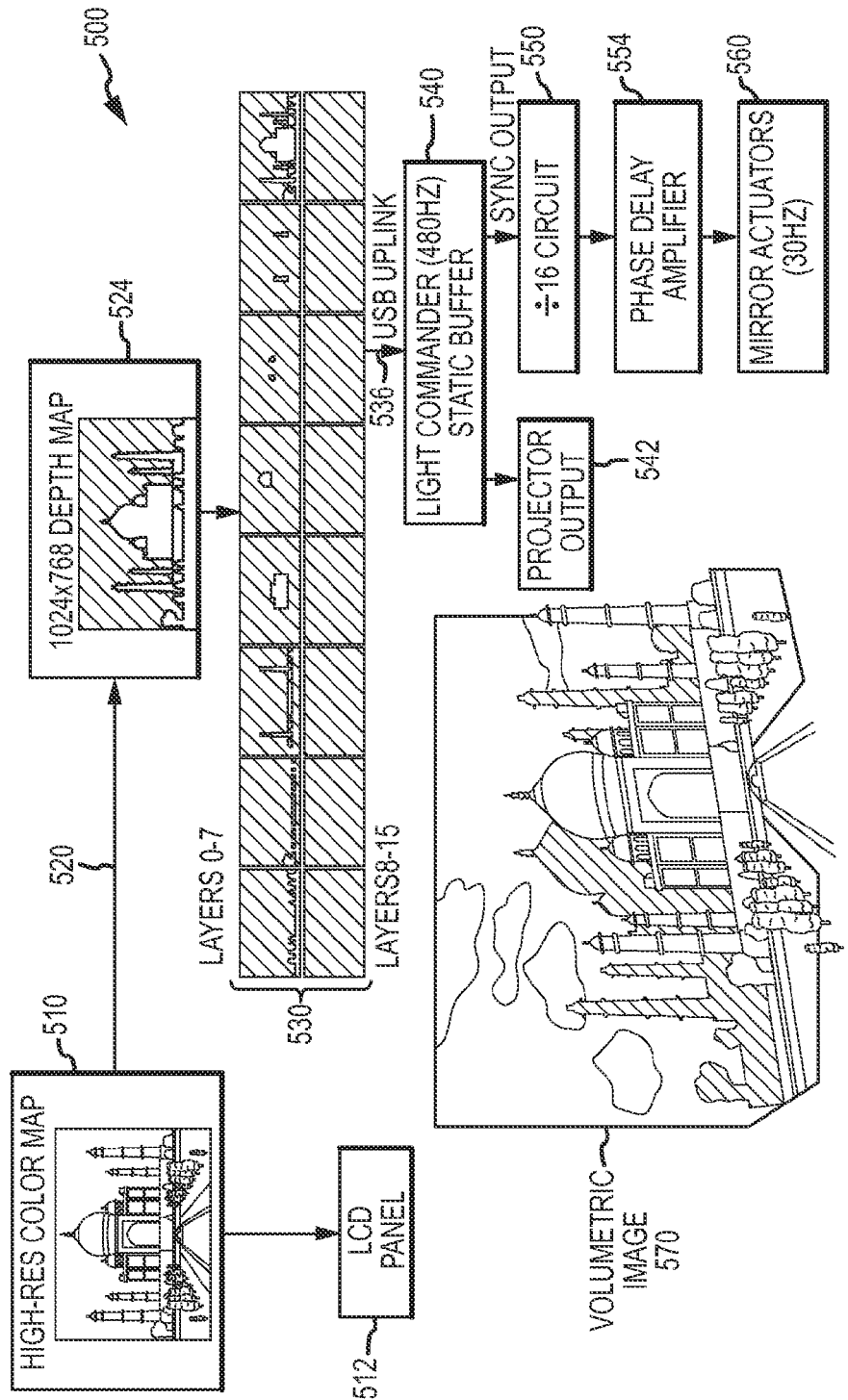
FIG. 5 illustrates functionally a method of controlling a volumetric display (such as the systems of FIGS. 2 and 4A-4C) to provide a volumetric image.

FIG. 5 illustrates functionally a method 500 of controlling a volumetric display (such as systems 200 and 400 of FIGS. 2 and 4A-4C) to provide a volumetric image 570. As shown, a high-resolution color map or image 510 is provided as input in the method 500 and is used to operate the LCD panel 512. The high-resolution map 510 is processed at 520 to create a depth map 524 assuming use of a high-speed projector as the backlight (e.g., a depth map with 1024 by 768 resolution to match or map to the pixels of the LCD panel 512). This allows the volumetric display to be controlled so as to provide per pixel depth in the generated volumetric display (e.g., decide for each pixel which display plane it will be drawn/displayed in the volumetric image). A lower resolution depth map would be used for an LED array such as a 16 by 16 depth map with an array of 16 by 16 LEDs.

The depth map 524 is segmented or separated into 16 layers or display planes in this embodiment as shown with depth map planes or layers 530. As shown, the first eight layers (layers 0-7) are used to draw or display the volumetric image 570 during a forward stroke of a mirror/beamsplitter while the second eight layers (layers 8-15) are left blank such that the projector projects no light during the backward stroke of the mirror (but, of course, drawing/display may take place in both directions of movement of the mirror if desired). As shown, the first eight layers of planar depth maps 530 each define a different portion of the color map/image 510 to display (e.g., portions or sets of pixels in LCD panel 512 to illuminate). This may involve first showing foreground portions of image 510, second showing midground/central portions of image 510, and then third illuminating background portions of image 510, but the sequence of when and what portions of a color map/image 510 are displayed may vary significantly to practice the method 500. In other embodiments, up to 960 binary images may be used, with some projectors presently having a capacity to display 5000 images per second. In one prototype display, the inventors were able to provide up to 83 levels on static imagery or to provide 0.67 seconds of animation for 24 levels at 30 fps (as the displayed volumetric image does not have to be a static image but can also be animated by changing the input image/color map 510).

The depth map 524 and/or its layers 530 are provided via link 536 to the projector for storing in a static image buffer 540. The frequency at which the projector proceeds through these layers may be defined by the user with a frequency of 480 Hz shown in this example with 16 layers or display planes (8 forward and 8 backward in mirror movement). The layer or plane maps 530 are then provided via buffer 540 to control the projector and provide projector output 542 onto the back of the LCD panel 512 (e.g., focused onto a thin diffuser at the back of the panel 512). As mentioned above, the LCD and projector output may be aligned using Moiré patterns or other techniques.

Concurrently, a frame sync signal or output is provided to control operation of the inertial drivers driving or vibrating the rim or support hoop of the flexible mirror element. The sync signal may be processed via a divide-by-16 circuit 550 (e.g., due to use of 16 depth planes or layers at 530 to segment the depth map 524) and passed to the mirror actuators/drivers 560 via an optional phase delay amplifier(s) 554, whereby the mirror actuator 560 is synchronized with the projector output 542 and, in this example, resonates at a frequency of about 30 Hz.

The combination of the mirror element movement via rim drivers 560, the color map displayed on LCD panel 512, and the projector output 542 through the LCD panel 512 (and use of a concave mirror not shown in FIG. 5 but shown in FIGS. 2 and 4A-4C) generates the volumetric image 570 in the observer's space (e.g., in front of the resonating mirror element of the beam splitter). As shown generally in FIG. 5, the volumetric image is made up of a number of displayed real image planes corresponding in number and content with the depth map layers 530 (e.g., 8 differing layers drawn during forward stroke of the beamsplitter), whereby a real image with volume is displayed to an observer (with a depth defined by the distance between the real image planes associated with layers 0 and 7 of the set 530 of depth plane layers).

At this point, it may be useful to continue with a real world or practical examples describing volumetric displays implemented by the inventors to test or prove the concepts described herein. In one implementation, the color map or input image for the LCD panel was a digital image or photograph of a famous location (the Taj Mahal) and the corresponding depth map was created manually by segmenting and assigning portions of the image to one of eight depth levels. For each level in the depth map, a binary (one bit per pixel) .bmp image pattern (1024 by 768 pixels) was created and loaded into the projector's buffer along with eight blank image patterns (for the backward stroke of the beamsplitter). The projector's frame rate was set to 480 patterns/second and later divided by sixteen to generate the frame sync signal. The eight levels of the image (the Taj Mahal) were illuminated in sequence during the forward mirror stroke and no illumination occurred during the backward mirror stroke.

In another implementation, real-time imagery was displayed with a volumetric display by sending encoded depth maps to the projector, e.g., via an HDMI link. In one particular case, the projector was a DLP LightCommander projector, and in its Real-Time DVI Structured Light Mode, the projector accepts an image stream (e.g., 1024 by 768 pixel resolution, 24 bit: R8G8B8 at 60 frames/second) via an HDMI port. Each image encodes 24 binary patterns by packing pixels in a bit-plane format (e.g., .dbi format). For example, the binary image of depth level zero is stored in the .dbi image's red channel bit 0 positions, depth level one is stored in the .dbi image red channel's bit 1 positions, and so on. The projector replays each bit-plane pattern in sequence at 1440 patterns/second. As in the static case, the projector generates a synchronization pulse each time a new pattern is displayed. The pulse stream is divided by 48 to derive a 30 Hz frame sync pulse for controlling the projector shutter and for driving the rim drivers or mirror actuators of the beamsplitter.

For dynamic content, the corresponding color and encoded depth maps may be generated using software renderers or using a depth-capable camera such as, but not limited to, the Kinect™ distributed by Microsoft, Inc. With a software renderer, the color and depth maps may be rendered from 3D models using OpenGL/GLSL or the like with an orthographic projection. The color image is rendered using lighting and texture mapping (e.g., 1024 by 768 and 24-bit color), while the depth image is not explicitly rendered but, instead, computed pixel by pixel during the .dbi image encoding process. With a depth-capable camera, the driver (e.g., v002 Open Kinect based on libfreenect with a Kinect camera) provided a color image (e.g., 640 by 480 and 24-bit color) and an explicit depth map (e.g., 10-bit grayscale image). The driver aligns the camera's depth and color images, and the color map is up-sampled to 1024 by 768, while the explicit depth map is sampled during the .dbi image encoding process.

The color image is rendered on one half of a 2048 by 768 combined frame. The .dbi image is rendered on the other half of the frame. For each fragment/pixel in the .dbi image, a GLSL fragment shader may be used to assign the fragment to one of 24 levels based on its depth. In the software rendered case, the depth is determined from the fragment's floating point z-coordinate, which is linear due to the orthographic projection. In the camera case, the depth may be sampled from its depth map (e.g., a 10-bit depth map or the like). The GLSL shader colors the fragment according to the .dbi encoding. For instance, level 0 is colored R=1, G=0, B=0 (red channel bit 0); level 24 is colored R=0, G=0, B=128 (blue channel bit 7). The prototype was configured to use a modified .dbi encoding with GRB ordering, with reassigned R=128 and B=128 to work around a noticed exchange in depth plane order.

During testing of prototypes, it was determined that the displayed depth layers of the volumetric image were not equally spaced, and this unequal spacing is likely because the beamsplitter (or its mirror element) vibration is sinusoidal and because of the projector's constant frame rate. Hence, even depth sampling leads to a distorted volumetric display (e.g., the displayed image is distorted relative to the input color map). However, it was determined that sinusoidal depth sampling could be used to provide an undistorted volumetric image. Stated another way, when the .dbi encoding process assigns depth layers using equispaced depth map values, the displayed objects appear distorted. If an undistorted image is desired, layers are instead assigned with a non-linear mapping (e.g., using sinusoidal depth sampling).

In a particular implementation, the 2048 by 768 combined frame was output from a graphics card (e.g., a GeForce 330M (NVIDIA) graphics card) in a computer controller (e.g., a MacBook Pro distributed by Apple, Inc.) and into a frame splitter (e.g., a Triple-Head-2-Go distributed by Matrox). The two halves of the combined frame were output from two of the frame splitter's ports: one carrying the color image to the LC panel and the other one carrying the .dbi-encoded depth map to the HDMI port of the projector (e.g., a DLP LightCommander or the like). In a real-time operating mode, control can again draw or display on one mirror stroke (the forward stroke) to achieve 24 depth levels for the volumetric display. A blank (or black) image is sent every other frame in some implementations to provide an improved volumetric display. In other cases, a synchronized rotating shutter may be used to blank the projector in the optical domain.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. An apparatus for generating volumetric images, comprising:
    an image display assembly displaying a first image at a first display time and a second image at a second display time;
    a flexible two-way mirror element with a back side and a front side, wherein the first and second images are reflected from the back side;
    a rim support attached to a peripheral edge of the mirror element;
    a driver driving the rim support to resonate the mirror element between a convex configuration and a concave configuration while reflecting the first and second images; and
    a concave mirror positioned relative to the mirror element to receive the reflected first and second images and to transmit the first and second images through the mirror element to generate a real volumetric image with a volume defined by display locations of the first and second images, wherein the image display assembly and the concave mirror are positioned on a common side of the mirror element.

2. The apparatus of claim 1, wherein the driver comprises at least two acoustic drivers attached at spaced apart locations to the rim support.

3. The apparatus of claim 2, wherein the mirror element is resonated by the acoustic drivers at a frequency of at least about 30 Hertz.

4. The apparatus of claim 1, wherein the mirror element comprises a sheet of aluminized polyester and the apparatus further comprises two or more tensioning elements attaching the peripheral edge of the mirror element to the rim support and selectively applying tensile forces to the sheet to define a surface tension for the mirror element.

5. The apparatus of claim 1, wherein the image display assembly includes a transmissive display panel and a backlight selectively operating to sequentially light first and second portions of the display panel to display the first and second images, the sequential lighting being repeated during the displaying of the first and second images to provide the real volumetric image.

6. The apparatus of claim 5, wherein the transmissive display panel comprises a liquid crystal display panel.

7. An apparatus for generating volumetric images, comprising:
    an image display assembly displaying a first image at a first display time and a second image at a second display time;
    a flexible two-way mirror element with a back side and a front side, wherein the first and second images are reflected from the back side;
    a rim support attached to a peripheral edge of the mirror element;
    a driver driving the rim support to resonate the mirror element between a convex configuration and a concave configuration while reflecting the first and second images; and
    a concave mirror positioned relative to the mirror element to receive the reflected first and second images and to transmit the first and second images through the mirror element to generate a real volumetric image with a volume defined by display locations of the first and second images,
    wherein the image display assembly includes a transmissive display panel and a backlight selectively operating to sequentially light first and second portions of the display panel to display the first and second images, the sequential lighting being repeated during the displaying of the first and second images to provide the real volumetric image, and
    wherein the backlight comprises a high-speed projector switching between the first and second portions, the first and second portions defined by depth maps controlling projection of light onto the transmissive display panel.

8. The apparatus of claim 7, wherein the depth maps provides a mapping of pixels in the first and second images on the liquid crystal display panel to the projected light from the projector.

9. The apparatus of claim 7, wherein the driver comprises at least two acoustic drivers attached at spaced apart locations to the rim support.

10. The apparatus of claim 9, wherein the mirror element is resonated by the acoustic drivers at a frequency of at least about 30 Hertz.

11. The apparatus of claim 7, wherein the mirror element comprises a sheet of aluminized polyester and the apparatus further comprises two or more tensioning elements attaching the peripheral edge of the mirror element to the rim support and selectively applying tensile forces to the sheet to define a surface tension for the mirror element.

12. The apparatus of claim 7, wherein the transmissive display panel comprises a liquid crystal display panel.

13. A display device, comprising:
    a varifocal beamsplitter;
    a concave mirror;
    a display panel;
    a light source selectively lighting a back surface of the display panel; and
    a controller providing a color map to the display panel to generate a 2D color image on the display panel and concurrently providing a series of depth maps to the light source to light a series of differing sets of pixels of the display panel corresponding to each of the depth maps, whereby the sets of pixels are illuminated by the light provided to the back surface causing a series of 2D images to be displayed at a corresponding series of spaced-apart planes in a display space in front of the varifocal beamsplitter after reflection from both a back surface of the varifocal beamsplitter and the concave mirror,
    wherein the varifocal beamsplitter includes a flexible mirror element comprising a metalized transmissive sheet and a driver vibrating the flexible mirror element to resonate between convex and concave configurations to display each of the 2D images at differing display planes in front of the varifocal beamsplitter.

14. A display device, comprising:
    a varifocal beamsplitter;
    a concave mirror;
    a display panel;
    a light source selectively lighting a back surface of the display panel; and
    a controller providing a color map to the display panel to generate a 2D color image on the display panel and concurrently providing a series of depth maps to the light source to light a series of differing sets of pixels of the display panel corresponding to each of the depth maps, whereby the sets of pixels are illuminated by the light provided to the back surface causing a series of 2D images to be displayed in a display space in front of the varifocal beamsplitter after reflection from both a back surface of the varifocal beamsplitter and the concave mirror, wherein the varifocal beamsplitter includes a mirror element comprising a metalized transmissive sheet and a driver vibrating the mirror element to display each of the 2D images at differing display planes in front of the varifocal beamsplitter, and wherein the driver comprises a plurality of acoustic actuators affixed to a hoop supporting the metalized transmissive sheet and wherein the acoustic actuators are operated to resonate the metalized transmissive at a frequency of at least about 30 Hz.

15. The display device of claim 14, wherein the light source comprises a high-speed projector providing at least about 1500 lumens to light the back surface of the display panel.

16. The display device of claim 15, wherein the depth maps are provided to the high-speed projector to be synchronized with operation of the acoustic drivers.

17. The display device of claim 13, wherein the flexible mirror element is positioned to place the back surface at an angle of at least about 30 degrees from the display panel.

18. The display device of claim 14, wherein the varifocal beamsplitter includes a flexible mirror element comprising a metalized transmissive sheet and a driver vibrating the flexible mirror element to resonate between convex and concave configurations to display each of the 2D images at differing display planes in front of the varifocal beamsplitter.

19. A volumetric display, comprising:
a spatial modulator displaying a 2D color image;
a white light modulator sequentially lighting differing portions of the 2D color image; and
a beamsplitter comprising a sheet of two-way mirror material attached to a hoop-shaped frame and drivers driving the hoop-shaped frame to move the sheet between a concave and convex shape at a rate of at least about 30 Hertz,
wherein the differing portions of the 2D color image are transmitted through the sheet during the driving by the drivers to generate a volumetric display including a plurality of spaced-apart real images,
wherein the sheet has a front side and a back side,
wherein the spatial modulator is positioned in the display assembly such that the differing portions of the 2D color image first strike the back side of the sheet prior to being transmitted through the sheet, and wherein the space-apart real images of the volumetric display are generated in a space opposite the back side of the sheet at a plurality of distances from the front side of the sheet.

20. The display of claim 19, wherein the light modulator comprises a binary light projector and wherein the differing portions are defined by a number of depth maps.

21. The display of claim 19, further comprising a concave reflector reflecting light associated with the differing portions through the sheet after the light is reflected from a back side of the sheet.

22. The display of claim 19, wherein the spatial modulator comprises a liquid crystal display panel and wherein the differing portions each comprises a set of pixels of the liquid crystal display panel.

23. A volumetric display, comprising:
a spatial modulator displaying a 2D color image;
a white light modulator sequentially lighting differing portions of the 2D color image; and
a beamsplitter comprising a sheet of two-way mirror material attached to a hoop-shaped frame and drivers driving the hoop-shaped frame to move the sheet between a concave and convex shape at a rate of at least about 30 Hertz,
wherein the differing portions of the 2D color image are transmitted through the sheet during the driving by the drivers to generate a volumetric display including a plurality of spaced-apart real images,
wherein the light modulator comprises a binary light projector and wherein the differing portions are defined by a number of depth maps, and
wherein the drivers comprise at least three acoustic drivers positioned adjacent the hoop-shaped frame, whereby the sheet defines an aperture for display of the volumetric display substantially free of obstructions.

24. The display of claim 23, wherein the aperture has a diameter of at least about 2 feet.

25. The display of claim 23, further comprising a concave reflector reflecting light associated with the differing portions through the sheet after the light is reflected from a back side of the sheet.

26. The display of claim 23, wherein the spatial modulator comprises a liquid crystal display panel and wherein the differing portions each comprises a set of pixels of the liquid crystal display panel.

* * * * *